Sept. 6, 1960

G. F. SCHROEDER 2,951,397

VARIABLE ESCAPEMENT MECHANISM

Filed Oct. 20, 1958

INVENTOR
George F. Schroeder
BY Victor D. Borst
ATTORNEY

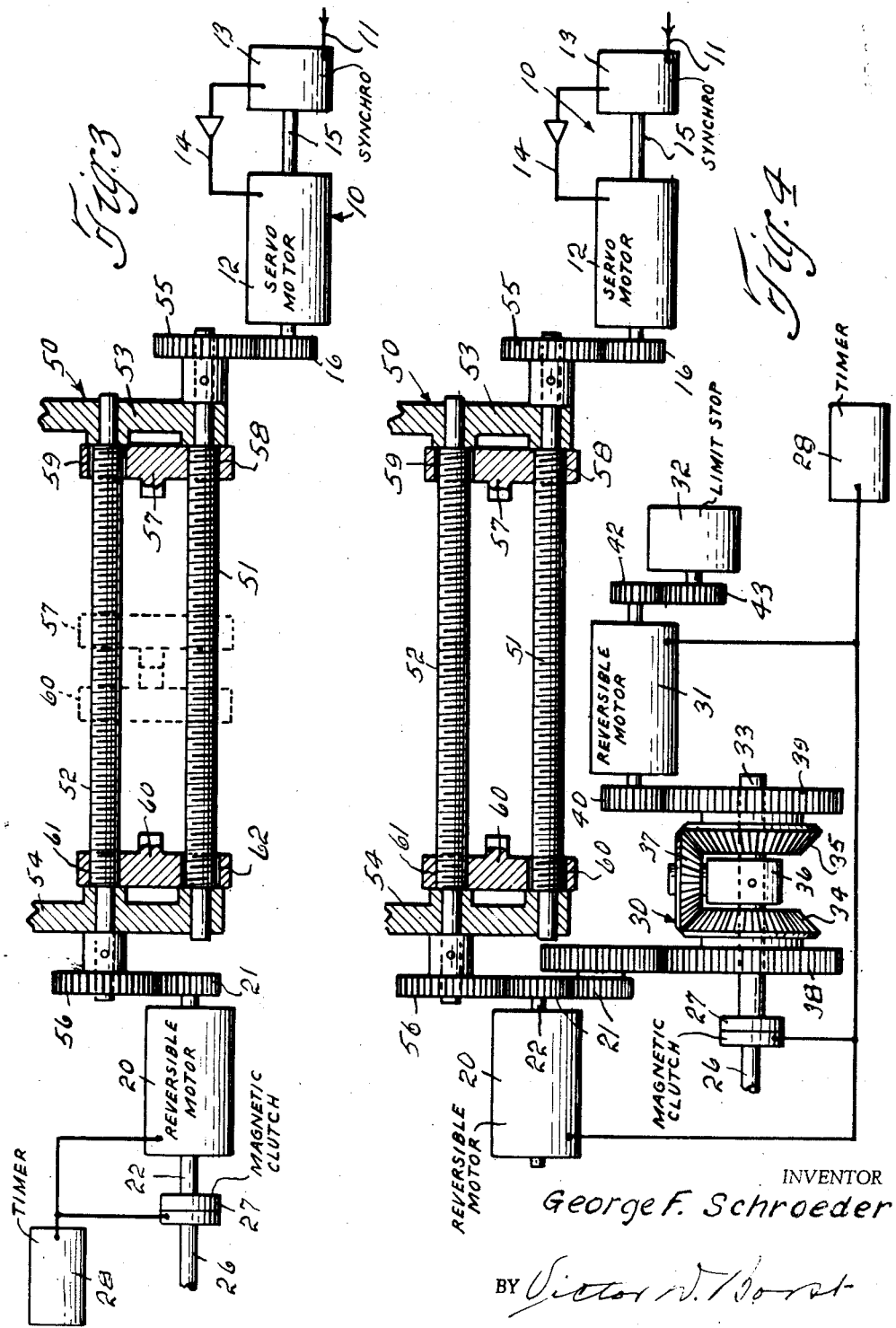

United States Patent Office 2,951,397
Patented Sept. 6, 1960

2,951,397

VARIABLE ESCAPEMENT MECHANISM

George F. Schroeder, Pines Lake, N.J., assignor to Sperry Rand Corporation, Ford Instrument Company Division, Wilmington, Del., a corporation of Delaware Filed Oct. 20, 1958, Ser. No. 768,181

9 Claims. (Cl. 74—675)

This invention relates to an integrator by which a variable rate is automatically integrated in terms of a constant. Integrators of this type are used for various different purposes in various different ways. The output of the integrator may be used to directly control the operation of many different types of apparatus or it may be imparted to a computer or similar mechanism through which other apparatus is controlled. Or the output may actuate a register or counter. One such use of the integrator as shown herein is to automatically register the total distance travelled by an airplane which is travelling as a known constantly varying speed, during a given period of time.

Various different types of integrators are available for such uses, but all are subject to certain disadvantages. The ball and disk type of integrator, which is driven by a synchronous motor which is excited by an electronic time reference, requires an excessive amount of electronic amount of electronic apparatus. Another method of integration in which a tachometric rate generator is used has the disadvantage that the output voltages of the generator are not sufficiently stable with respect to variations in temperature to adequately perform over aircraft environmental temperature ranges. Another method of integration, which utilizes a linear transformer or potentiometer which is servoed in such a way as to balance a voltage proportional to the input rate, has the disadvantages of excessive wear, short life and poor accuracy, especially over an extended temperature range.

It is, therefore, one of the principal objects of this invention to provide a new and improved apparatus for integrating a variable rate in terms of a constant in which the amount of high power electronic apparatus necessary for operation is materially reduced.

Another object of the invention is to provide a device of the aforesaid character having a long life and high accuracy over extended temperature ranges.

Still another object of the invention is to provide a device of the aforesaid character which is of simple construction, efficient in operation, and relatively inexpensive to manufacture.

Having stated the principal objects of the invention, other and more limited objects of the invention will be apparent from the following specification and the accompanying drawings forming a part thereof in which:

Fig. 3 is a diagrammatic view illustrating another form of the invention; and

Fig. 4 is a diagrammatic view illustrating still another form of the invention.

Figure 1:
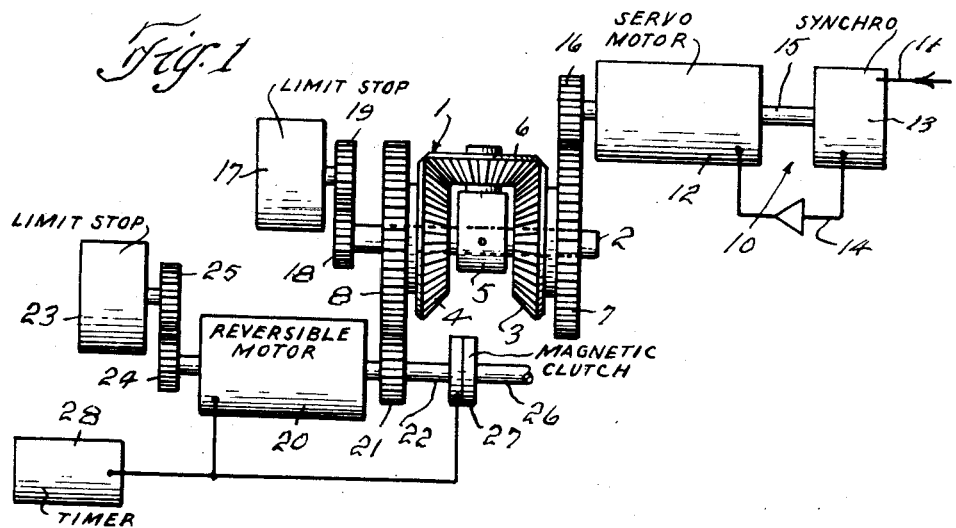
Fig. 1 is a diagrammatic view illustrating one form of the invention.

Referring first to Fig. 1 of the drawings by reference characters, the numeral 1 indicates generally a conventional differential having the spider shaft 2 on which a pair of opposed similar bevel gears 3 and 4 are rotatably mounted. A spider 5 which is rigidly secured on the shaft 2 between the gears 3 and 4 has a bevel spider pinion 6 rotatably mounted thereon which is disposed in constant mesh with the gears 3 and 4. The bevel gear 3 has an end gear 7 rigidly secured thereto through which rotation is imparted to the bevel gear 3; and the bevel gear 4 has an end gear 8 rigidly secured thereto through which rotation is imparted to the bevel gear 4.

The rate to be integrated is imparted to the differential 1 by a conductor 11 through a conventional servo mechanism 10 which comprises a servo motor 12 and a synchro 13 of standard construction. The synchro 13 controls the rotation of the servo motor 12 in either direction through an electrical connection 14 in accordance with the rate imparted to the synchro. The armature shaft 15 of the servo motor is provided with a pinion 16 which is disposed in constant mesh with the end gear 7 of the differential 1. The output of the spider shaft 2 is imparted to a limit stop 17 through a pinion 18 secured to the spider shaft 2 and a gear 19 carried by the limit stop 17. The limit stop 17 is a fixed conventional mechanical stop of standard construction having a fixed positive stop position and a negative stop position. The servo motor 12 is operative through the differential 1 to vary the positive stop position of the limit stop 17 with respect to a negative or zero stop position of stop 23 in accordance with the direction and the amount of rotation of the servo motor 12.

A reversible motor 20 is operatively connected to the differential 1 by a pinion 21 which is mounted upon the armature shaft 22, of the motor 20, in mesh with the end gear 8 of the differential 1. The motor 20 is also operatively connected to a limit stop 23, similar to the limit stop 17, by meshing gears 24 and 25 carried by the armature shaft 22 and limit stop 23 respectively. The armature shaft 22 of the motor 20 is also connected to an output shaft 26 by a standard magnetic clutch 27. The direction of rotation of the motor 20 and the energization of the clutch 27 are controlled by a conventional timer 28 which periodically alternately applies positive and negative voltages to the motor 20 and the clutch 27. The limit stop 23 is operative to stop the rotation of the motor 20 at the limit of its rotation in a negative direction, after which the timer 28 applies a positive voltage to the motor 20 and the clutch 27 thereby effecting rotation of the motor 20 in a positive direction and engagement of the clutch 27; and the limit stop 17 is operative to stop the rotation of the motor 20 in a positive direction, after which the timer 28 applies a negative voltage to the motor 20 and clutch 27 thereby effecting rotation of the motor 20 in a negative direction and disengagement of the clutch 27. It will thus be seen that during negative rotation of the motor 20 there is no output from the motor 20 through the clutch 27 to the output shaft 26.

The input rate to be integrated is imparted to the apparatus in terms of the direction of rotation of the servo motor 12 and the number of revolutions thereof. If the rate increases in magnitude the servo motor 12 will be rotated in a direction to move the effective positive stop position of the limit stop 17 by means of the action of differential 1 farther away from the negative or zero stop position of limit stop 23, and if it decreases in magnitude the servo motor 12 will rotate in the opposite direction, and move the positive stop position of the limit stop 17 closer to the negative or zero stop position of limit stop 23. During any time that the rate remains constant there will be no rotation of the servo motor 12. It will therefore be apparent that the farther the positive stop position of the limit stop 17 is from the zero position, the greater the output of the motor 20 through the clutch 27 to the output shaft 26; and the closer the positive stop position of the limit stop 17 to the zero position, the less the output of the motor 20 through the clutch 27 to the output shaft 26. As a concrete example, let it be assumed that the rate imparted is equivalent to 2000 revolutions of the servo motor 12. The positive stop position of the limit stop 17 will therefore be set accordingly, and the output of the motor 20 in rotating between its negative stopped position, as determined by the limit stop 23, and its positive stopped position, as determined by the limit stop 17, will be a rotation equivalent to 2000 revolutions of the servo motor 12. If the imparted rate is then reduced to the equivalent of 1000 revolutions of the servo motor 12, the setting of the positive stop position of the limit stop 17 will be changed accordingly, and the output of the motor 20 will be a rotation equivalent to 1000 revolutions of the servo motor 12. As previously stated, there is no output from the motor 20 during the negative rotation thereof from the positive stop position back to the negative stop position. The device thus far described is therefore a variable escapement integrator in which the input and output are always positive, and in which the output is always proportional to the input.

Figure 2:
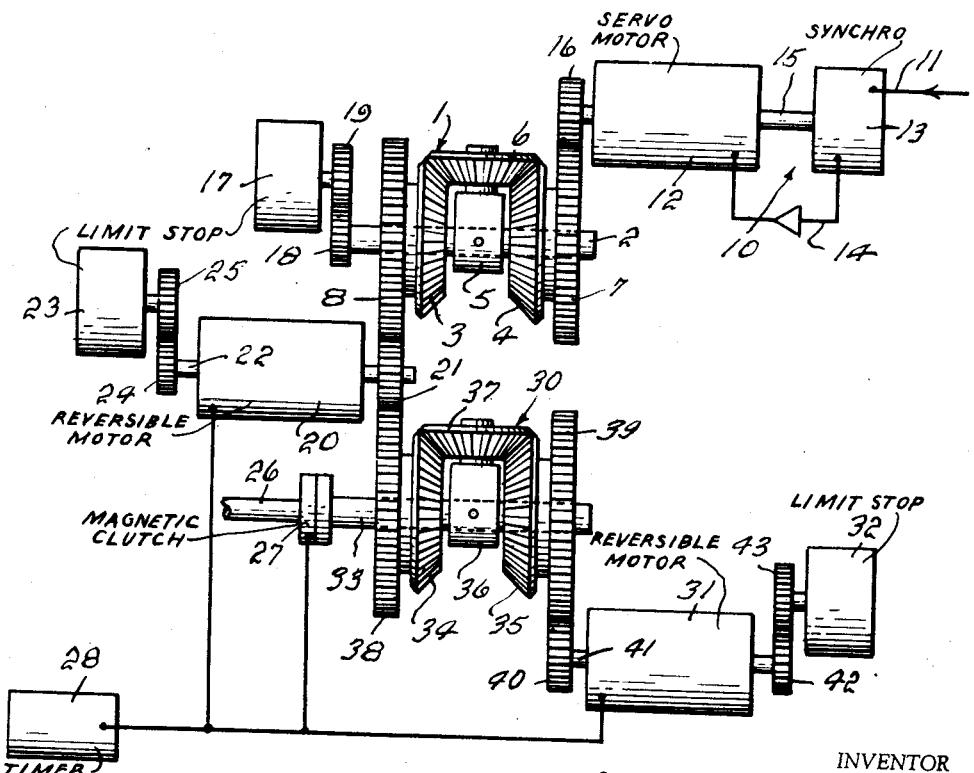
Fig. 2 is a diagrammatic view illustrating another form of the invention.

In order to adapt the integrator as shown and described in connection with Fig. 1 for use in integrating both plus and minus input rates to give a plus or minus output, I modify the apparatus shown in Fig. 1 by adding thereto a second differential 30 similar to the differential 1, a third motor 31 which is similar to the motor 20, a third limit stop 32 which is similar to the limit stops 17 and 23, and by connecting the output shaft 26 to the spider shaft 33 of the second differential 30 by the magnetic clutch 27 instead of to the armature shaft 22 of the motor 20, all as shown in Fig. 2.

Referring now to Fig. 2 of the drawing, the differential 30 comprises the spider shaft 33 on which are rotatably mounted the opposed similar bevel gears 34 and 35. A spider 36 which is secured to the spider shaft 33 between the bevel gears 34 and 35 has a spider pinion 37 rotatably mounted thereon which is disposed in constant mesh with the bevel gears 34 and 35. The bevel gear 34 has an end gear 38 secured thereto which is disposed in constant mesh with the gear 21 secured on the armature shaft 22 of the motor 20; and the bevel gear 35 has an end gear 39 secured thereto which is disposed in contant mesh with a gear 40 secured to the armature shaft 41 of the motor 31. The armature shaft 41 of the motor 31 is also operatively connected to the limit stop 32 by a pair of meshing gears 42 and 43 which are carried by the armature shaft 41 and limit stop 32 respectively. The output of the motor 20 is imparted to the bevel gear 34 of the differential 30 through the meshing gears 21 and 38, and the output of the motor 31 is imparted to the bevel gear 35 of the differential 30 through the meshing gears 40 and 39. The respective outputs of the motors 20 and 31 are subtracted by the differential 30 and the result imparted to the output shaft 26 through magnetic clutch 27 by the spider shaft 33 of the differential 30. In this form of the invention the timer 28 periodically alternately applies a positive and a negative voltage to the motor 31 in unison with the application of similar voltages to the motor 20 and magnetic clutch 27. In the use of this form of the invention the limit stop 32 is set so that the total revoluion equivalent of the motor 31 will be minus 1000 (following the example given in connection with Fig. 1). The zero condition will prevail when the motor 20 produces the rotation equivalent of plus 1000 and the motor 31 the rotation equipment of minus 1000. This will be the zero position of the rate input servo motor 12. If the servo motor 12 is varied plus or minus about this position, for example, to produce a rotation equivalent of 500 out of motor 20 the resultant output of the differential 30 will be a rotational equivalent of minus 500; and if the servo motor 12 is varied from its zero position to produce a rotation equivalent of 1500 out of the motor 20 the resultant output of the differential 30 will be a rotational equivalent of plus 500. It will therefore be seen that either a plus or minus rate may be imparted to the apparatus and that the output thereof may be either plus or minus.

In Fig. 3 I have shown another modification of the integrator disclosed in Fig. 1. In this form of the invention I eliminate the differential 1 and the limit stops 17 and 23 and substitute therefor a stop mechanism, generally indicated by the numeral 50, which comprises a pair of spaced parallel similar screws 51 and 52 which are rotatably supported by and between a pair of hangers 53 and 54. A gear 55, through which the screw 51 is adapted to be rotated, is secured to one end of the screw 51; and a gear 56, through which the screw 52 is adapted to be rotated, is secured to the opposite end of the screw 52. A limit block 57 is threaded onto the screw 51 as indicated at 58 and is slidably mounted upon the screw 52 as indicated at 59; and a stop block 60 is threaded onto the screw 52 as indicated at 61 and slidably mounted upon the screw 51 as indicated at 62. Rotation of the screw 51 in first one direction and then the other will move the limit block 57 back and forth between the hanger 53 and the stop block 60; and rotation of the screw 52 in first one direction and then the other will move the stop block 60 back and forth between the hanger 54 and the limit block 57.

The gear 16 on the armature shaft 15 of the servo motor 12 is disposed in permanent mesh with the gear 55 secured to the end of the screw 51; and the gear 21 on the armature shaft 22 of the motor 20 is disposed in permanent mesh with the gear 56 secured to the end of the screw 52.

The block 60 is operative to limit the negative rotation of the motor 20 by engagement with the hanger 54, and the positive rotation of the motor 20 by engagement with the block 57, the position of which between the hanger 53 and the block 60 is dependent upon the rate imparted to the servo mechanism 10. The output of the motor 20 to the output shaft 26 is therefore dependent upon the position of the block 57 with respect to the hanger 53. When the block 57 is in engagement with the hanger 53 as shown in full line in Fig. 3, the output of the motor 20 will be maximum; and when the block 57 is in a mid-position as shown in dotted lines in Fig. 3, the output of the motor 20 will be proportionately less. Otherwise the operation of this form of the invention is the same as that described in connection with the form of the invention shown in Fig. 1, and the input and output are always positive.

In Fig. 4 I have shown the integrator shown and described in connection with Fig. 3 adapted for integrating both plus and minus input rates and to give a plus or minus output. As shown in Fig. 4, I modify the form of the invention shown in Fig. 2 by substituting the stop mechanism 50, shown in Fig. 3, for the differential 1 and limit stops 17 and 23 shown in Fig. 2. Otherwise this form of the invention is the same as that shown in Fig. 2 and the operation thereof is the same as described in connection with Figs. 2 and 3.

From the foregoing it will be apparent to those skilled in this art that I have provided a very simple and efficient mechanism for accomplishing the objects of the invention.

It is to be understood that I am not limited to the specific constructions shown and described herein as various modifications may be made therein within the spirit of the invention and the scope of the appended claims.

What is claimed is:

1. An integrator of the character described comprising a reversible motor, which is adapted to rotate back and forth between negative and positive stopped positions, limit stop means operatively connected to said motor by which the rotation of said motor in a negative direction is stopped and positive stop means operatively connected to said motor by which the rotation of said motor in a positive direction is stopped, a periodically operating timer electrically connected to said motor by which a positive voltage is applied to said motor after being stopped by said limit stop means and a negative voltage applied to said motor after being stopped by said positive stop means, a servo mechanism operatively connected to said positive stop means by which the position of said positive stop means is adjusted in accordance with a rate imparted to said servo mechanism, an output shaft and means interposed between said motor and said output shaft through which the positive output of said motor is imparted to said output shaft.

2. An integrator as defined in claim 1, in which said last mentioned means includes a magnetic clutch which is adapted to be engaged when said motor is rotating in a positive direction and disengaged when said motor is rotating in a negative direction.

3. An integrator of the character described comprising a reversible motor which is adapted to rotate back and forth between negative and positive stopped positions, an output shaft, a magnetic clutch interposed between said output shaft and the armature shaft of said motor through which the positive output of said motor is imparted to said output shaft, limit stop means operatively connected to said motor by which the rotation of said motor in a negative direction is stopped and positive stop means operatively connected to said motor by which the rotation of said motor in a positive direction is stopped; a periodically operating timer electrically connected to said motor and to said magnetic clutch by which a positive voltage is applied to said motor and said magnetic clutch after the negative rotation of said motor is stopped by said limit stop to thereby effect engagement of said clutch and cause said motor to rotate in a positive direction, and by which a negative voltage is applied to said motor and said magnetic clutch after the positive rotation of said motor is stopped by said positive stop to thereby effect disengagement of said magnetic clutch and cause said motor to rotate in a negative direction; and a servo mechanism operatively connected to said positive stop means by which the effective position of said positive stop means is adjusted in accordance with a rate imparted to said servo mechanism.

4. An integrator of the character described comprising a differential having an output spider shaft and a pair of opposed input gears which are rotatably mounted on said spider shaft and geared together by a spider pinion which is mounted on a spider secured to said spider shaft, a first limit stop geared to said output spider shaft, a servo mechanism including a servo motor which is geared to one of said differential input gears, a reversible motor geared to the other of said differential input gears, a second limit stop geared to said reversible motor, said servo motor being operative through said differential to adjust said first limit stop in accordance with a rate imparted to said servo mechanism, said first limit stop being operative through said differential to limit the rotation of said reversible motor in a positive direction and said second limit stop being operative to limit the rotation of said reversible motor in a negative direction, an output shaft, a magnetic clutch interposed between said output shaft and the armature shaft of said motor through which the positive output of said motor is imparted to said output shaft; a periodically operating timer electrically connected to said motor and to said magnetic clutch by which a positive voltage is applied to said reversible motor and said magnetic clutch after the negative rotation of said reversible motor is stopped by said second limit stop to thereby effect engagement of said magnetic clutch and cause said reversible motor to rotate in a positive direction, and by which a negative voltage is applied to said reversible motor and said magnetic clutch after the positive rotation of said reversible motor is stopped by said first limit stop to thereby effect disengagement of said magnetic clutch and cause said reversible motor to rotate in a negative direction.

5. An integrator of the character described comprising a reversible motor, a servo mechanism including a servo motor through which a rate is imparted to said integrator, limit stop mechanism by which the positive and negative rotation of said reversible motor is alternately stopped after predetermined intervals of rotation in each direction, an output shaft, a magnetic clutch interposed between said output shaft and the armature shaft of said motor through which the output of said motor is imparted to said output shaft; a periodically operating timer electrically connected to said motor and said magnetic clutch by which a positive voltage is applied to said reversible motor and to said magnetic clutch after said reversible motor is stopped in negative position to thereby effect engagement of said magnetic clutch and cause said reversible motor to rotate in a positive direction, and by which a negative voltage is applied to said reversible motor and said magnetic clutch after said reversible motor is stopped in positive position to thereby disengage said magnetic clutch and cause said reversible motor to rotate in a negative direction.

6. An integrator as defined in claim 5 in which said limit stop mechanism comprises a pair of spaced parallel similar rotatably mounted screws one of which is geared to said servo motor for rotation thereby in accordance with a rate imparted to said servo mechanism and the other of which is geared to said reversible motor for rotation thereby, a limit block mounted upon said screws and adapted to be moved back and forth along said screws by the rotation of the said one of said screws by said servo motor, a stop block mounted upon said screws and adapted to be moved back and forth along said screws between said limit block and a fixed abutment by the rotation of the said other of said screws by said reversible motor, said stop block being operative to stop the negative rotation of said reversible motor by engagement with said fixed abutment and to stop the positive rotation of said reversible motor by engagement with said limit block.

7. An integrator of the character described comprising a reversible motor, a servo mechanism through which a rate is imparted to said integrator, stop means operatively connected to said reversible motor by which the positive and negative rotation of said reversible motor is alternately stopped after predetermined intervals of rotation in each direction, a differential having an output spider shaft and a pair of opposed input gears which are rotatably mounted on said spider shaft and geared together by a spider pinion which is mounted upon a spider secured to said spider shaft, a second reversible motor, a limit stop operatively connected to said second reversible motor by which the positive and negative rotation of said second reversible motor is alternately stopped after predetermined intervals of rotation in each direction, a gear connection between said reversible motor and one of said differential input gears, a separate gear connection between said second reversible motor and the other of said differential input gears, an output shaft to which the combined output of said reversible motor and said second reversible motor is imparted by said spider shaft through a magnetic clutch which is interposed between said output shaft and said spider shaft; a periodically operating timer electrically connected to said reversible motor and said second reversible motor and to said magnetic clutch by which a positive voltage is applied to said reversible motors and said magnetic clutch after said motors are stopped in negative position to thereby effect engagement of said magnetic clutch and cause both of said motors to rotate in a positive direction, and by which a negative voltage is applied to said reversible motors and said magnetic clutch after said reversible motors are stopped in positive position to thereby disengage said magnetic clutch and cause said reversible motors to rotate in a negative direction.

8. An integrator of the character described comprising a differential having an output spider shaft and a pair of opposed input gears which are rotatably mounted on said spider shaft and geared together by a spider pinion which is rotatably mounted on a spider secured to said spider shaft, a limit stop geared to said output pinion shaft, a servo mechanism including a servo motor which is geared to one of said differential input gears, a reversible motor which is geared to the other of said differential input gears, a fixed limit stop geared to said reversible motor, said servo motor being operative through said differential to adjust the effective limit stop position in accordance with a rate imparted to said servo mechanism, said limit stop being operative through said differential to limit the rotaton of said reversible motor in a positive direction and said fixed limit stop being operative to limit the rotation of said reversible motor in a negative direction, a second differential having an output spider shaft and a pair of opposed input gears which are rotatably mounted on said second differential pinion shaft and geared together by a spider gear which is rotatably mounted on a spider secured to said spider shaft, a second reversible motor, a second limit stop geared to said second reversible motor by which the positive and negative rotation of said second reversible motor is alternately stopped after a predetermined interval of rotation in each direction, a gear connection between said reversible motor and one of the second differential input gears, a separate gear connection between said second reversible motor and the other of said second differential input gears, an output shaft to which the combined output of said reversible motor and said second reversible motor is imparted by said second differential spider shaft through a magnetic clutch which is interposed between said output shaft and said second differential spider shaft and by which said output shaft is detachably connected to said second differential spider shaft; a periodically operating timer electrically connected to both of said reversible motors and to said magnetic clutch by which a positive voltage is applied to said reversible motors and said magnetic clutch after said motors are stopped in negative position to thereby effect engagement of said magnetic clutch and cause said motors to rotate in a positive direction, and by which a negative voltage is applied to said reversible motors and said magnetic clutch after said reversible motors are stopped in positive position to thereby disengage said magnetic clutch and cause said reversible motors to rotate in a negative direction.

9. An integrator of the character described comprising a reversible motor, a servo mechanism including a servo motor through which a rate is imparted to said integrator, a pair of spaced parallel similar rotatably mounted screws one of which is geared to said servo motor for rotation thereby in accordance with a rate imparted to said servo mechanism and the other of which is geared to said reversible motor for rotation thereby, a limit block mounted upon said screws and adapted to be moved back and forth along said screws by the rotation of the said one of said screws by said servo motor, a stop block mounted upon said screws and adapted to be moved back and forth along said screws between said limit block and a fixed abutment by the rotation of the said other of said screws by said reversible motor, said stop block being operative to stop the negative rotation of said reversible motor by engagement with said fixed abutment and to stop the positive rotation of said reversible motor by engagement with said limit block, a differential having an output spider shaft and a pair of opposed input gears which are rotatably mounted on said second differential spider shaft and geared together by a spider gear which is rotatably mounted on a spider secured to said spider shaft, a second reversible motor, a limit stop means by which the positive and negative rotation of said second reversible motor is alternately stopped after a predetermined interval of rotation in each direction, a gear connecting said reversible motor and one of said differential input gears, a separate gear connection between said second reversible motor and the other of said differential input gears, an output shaft to which the combined output of said reversible motor and said second reversible motor is imparted by said spider shaft through a magnetic clutch which is interposed between said output shaft and said spider shaft and by which said output shaft is detachably connected to said spider shaft; a periodically operating timer electrically connected to said reversible motor and to said magnetic clutch and by which a positive voltage is applied to said reversible motors and said magnetic clutch after said motors are stopped in negative position to thereby effect engagement of said magnetic clutch and cause said motors to rotate in a positive direction, and by which a negative voltage is applied to said reversible motors and said magnetic clutch after said reversible motors are stopped in positive position to thereby disengage said magnetic clutch and cause said reversible motors to rotate in a negative direction.

References Cited in the file of this patent
UNITED STATES PATENTS

| | | |
|---|---|---|
| 2,399,685 | McCoy | May 7, 1946 |
| 2,420,016 | Sanders | May 6, 1947 |